United States Patent
Shukair et al.

(10) Patent No.: US 11,013,056 B2
(45) Date of Patent: May 18, 2021

(54) DYNAMIC PRIORITIZATION OF UPLINK TRAFFIC

(71) Applicant: QUALCOMM Incorporated, San Diego, CA (US)

(72) Inventors: Mutaz Shukair, San Diego, CA (US); Linhai He, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/380,908

(22) Filed: Apr. 10, 2019

(65) Prior Publication Data

US 2019/0320491 A1 Oct. 17, 2019

Related U.S. Application Data

(60) Provisional application No. 62/657,675, filed on Apr. 13, 2018.

(51) Int. Cl.
  *H04W 76/28* (2018.01)
  *H04B 17/327* (2015.01)
  *H04B 17/336* (2015.01)
  *H04W 28/02* (2009.01)
  (Continued)

(52) U.S. Cl.
  CPC .......... *H04W 76/28* (2018.02); *H04B 17/327* (2015.01); *H04B 17/336* (2015.01); *H04W 28/0221* (2013.01); *H04W 52/281* (2013.01); *H04W 72/1242* (2013.01); *H04W 72/1268* (2013.01)

(58) Field of Classification Search
  CPC ........... H04W 28/0221; H04W 52/281; H04W 72/1242; H04W 72/1268; H04W 76/28; H04B 17/327; H04B 17/336
  See application file for complete search history.

(56) References Cited

U.S. PATENT DOCUMENTS 9,622,171 B2 * 4/2017 Voigt ................ H04W 52/0232
2009/0207794 A1 8/2009 Meylan
(Continued)

OTHER PUBLICATIONS

International Search Report and Written Opinion—PCT/US2019/026927—ISA/EPO—dated May 29, 2019.
(Continued)

*Primary Examiner* — Brian P Cox
(74) *Attorney, Agent, or Firm* — Loza & Loza LLP

(57) ABSTRACT

Aspects of the disclosure relate to mechanisms for dynamic prioritization of uplink (UL) traffic at a user equipment (UE). In some examples, the UE may determine to delay transmission of UL traffic by skipping one or more UL transmission opportunities based on one or more factors, such as a power saving indication, a priority level of the UL traffic, a type of the UL traffic, a volume of the UL traffic, and/or current channel conditions. In some examples, the UE may be configured with a parameter controlling the ability of the UE to delay a transmission of UL traffic. In some examples, when the UE is operating in a semi-persistent scheduling mode and a power saving mode, such as a connected mode discontinuous reception (C-DRX) mode, the UE may dynamically interrupt an OFF duration of the C-DRX cycle to transmit UL traffic.

30 Claims, 10 Drawing Sheets

(51) Int. Cl.
  *H04W 52/28* (2009.01)
  *H04W 72/12* (2009.01)

(56) References Cited

U.S. PATENT DOCUMENTS

| | | | | |
|---|---|---|---|---|
| 2013/0308507 | A1* | 11/2013 | Wanstedt | H04W 52/0232 |
| | | | | 370/311 |
| 2014/0198699 | A1 | 7/2014 | Makharia et al. | |
| 2015/0289268 | A1* | 10/2015 | Ohta | H04W 4/70 |
| | | | | 370/336 |
| 2015/0365995 | A1* | 12/2015 | Tabet | H04W 76/28 |
| | | | | 370/311 |
| 2016/0242230 | A1* | 8/2016 | Huang | H04W 28/0268 |
| 2018/0014322 | A1* | 1/2018 | Loehr | H04W 52/0206 |
| 2018/0027424 | A1* | 1/2018 | Chen | H04W 24/02 |
| | | | | 455/450 |
| 2018/0049193 | A1 | 2/2018 | Belleschi et al. | |

OTHER PUBLICATIONS

LG Electronics Inc: "Semi-Persistent Scheduling in NR", 3GPP Draft; R2-1704496 Semi-Persistent Scheduling in NR, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15, 2017-May 19, 2017, May 4, 2017, 3 Pages, XP051275059, Retrieved from the Internet: URL:http://www.3gpp.org/ftp/tsg_ran/WG2_RL2/TSGR2_98/Docs/ [retrieved on May 4, 2017], Paragraph 2.1 and 2.2.

\* cited by examiner

DYNAMIC PRIORITIZATION OF UPLINK TRAFFIC

PRIORITY CLAIM

This application claims priority to and the benefit of Provisional Patent Application No. 62/657,675, entitled "A Method for Dynamic Prioritization of Uplink Traffic for New Radio Medium Access Control," filed in the U.S. Patent and Trademark Office on Apr. 13, 2018, the entire contents of which are incorporated herein by reference as if fully set forth below in their entirety and for all applicable purposes.

TECHNICAL FIELD

The technology discussed below relates generally to wireless communication systems, and more particularly, to dynamic prioritization of uplink (UL) traffic for New Radio (NR) medium access control (MAC).

INTRODUCTION

In a scheduled wireless communication network, transmissions between a base station and one or more user equipment (UE) within a cell are generally scheduled in each subframe or slot. For example, a scheduling entity (e.g., a base station) may assign resources (e.g., time-frequency resources) for downlink transmissions to one or more scheduled entities or mobile devices (e.g., user equipment or UEs) and grant the use of resources for uplink transmissions from one or more UEs. The downlink assignments and uplink grants may be provided to the UEs via a physical downlink control channel (PDCCH).

A common form of scheduling utilized in wireless networks is dynamic scheduling, where resources are scheduled when data is available to be transmitted. For example, in the downlink (e.g., from the base station to the UE), resources may be assigned when the base station has data to send to the UE. In the uplink (e.g., from the UE to the base station), the UE may transmit a scheduling request to the base station when data arrives in the UE's uplink buffer.

While dynamic scheduling works well for bursty, infrequent, or bandwidth consuming transmissions, dynamic scheduling is less ideal for low-latency or periodic transmissions due to the delay and overhead requirements involved with dynamic scheduling. Therefore, another type of scheduling, known as semi-persistent scheduling, is available in wireless communication systems to reduce scheduling overhead and to support low-latency transmissions. With semi-persistent scheduling (SPS), the UE is pre-configured by the base station with a periodicity of downlink assignments or uplink grants. Once configured, the UE may receive downlink transmissions at regular intervals or transmit uplink transmissions at regular intervals according to the periodicity. During SPS, the resource assignments and modulation and coding scheme may remain fixed for each transmission.

As the demand for mobile communications increases, research and development continue to advance uplink transmission flexibility not only to meet the growing demand, but also to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects relate to dynamic prioritization of uplink (UL) traffic at a scheduled entity (e.g., UE). In some examples, the UE may determine to delay transmission of UL traffic by skipping one or more UL transmission opportunities based on one or more factors, such as a power saving indication, a priority level of the UL traffic, a type of the UL traffic (e.g., where the type of the UL traffic indicates a delay sensitivity of the UL traffic), a volume of the UL traffic, and/or current channel conditions (e.g., radio frequency (RF) conditions). In some aspects of the disclosure, the ability of the UE to delay a transmission of UL traffic may be controlled with a parameter (e.g., a "skipULgrant" parameter) that may be enabled or disabled by the network.

In some examples, when the UE is operating in a semi-persistent scheduling (SPS) mode and a power saving mode, such as a connected mode discontinuous reception (C-DRX) mode, the UE may determine to delay the transmission of UL traffic during an SPS UL transmission grant (e.g., the scheduled entity may skip the SPS UL transmission grant) and may then transmit the UL traffic at a later time (e.g., the scheduled entity may transmit the UL traffic in a subsequent SPS UL transmission grant). The UL traffic may be accumulated in a transmission buffer and transmitted during a subsequent SPS UL transmission grant based on a QoS (e.g., a priority level of the UL traffic) and/or the amount of UL traffic in the transmission buffer. In addition, the UE may dynamically decide to interrupt an OFF duration of the C-DRX cycle to transmit UL traffic when an SPS data transmission opportunity (e.g., an SPS UL transmission grant) substantially coincides (e.g., overlaps) with the OFF duration of the C-DRX cycle.

In one aspect, the disclosure provides a method for dynamic prioritization of uplink traffic in a wireless communication network. The method includes determining, at a scheduled entity, to delay a transmission of uplink (UL) traffic based on at least a priority level of the UL traffic, a type of the UL traffic, a power saving mode of the scheduled entity, or a result of a cost function. The method further includes delaying the transmission of the UL traffic by skipping one or more skipped UL transmission opportunities of a plurality of UL transmission opportunities, and transmitting the UL traffic during a subsequent UL transmission opportunity of the plurality of UL transmission opportunities that is subsequent to the one or more skipped UL transmission opportunities.

In another aspect, the disclosure provides an apparatus for wireless communication that includes a processor, a memory communicatively coupled to the processor and a transceiver communicatively coupled to the processor. The processor is configured to determine to delay a transmission of uplink (UL) traffic based on at least a priority level of the UL traffic, a type of the UL traffic, a power saving mode of the scheduled entity, or a result of a cost function. The processor is further configured to delay the transmission of the UL traffic by skipping one or more skipped UL transmission opportunities of a plurality of UL transmission opportunities, and transmit the UL traffic during a subsequent UL transmission opportunity of the plurality of UL transmission opportunities that is subsequent to the one or more skipped UL transmission opportunities.

In another aspect, the disclosure provides a method for dynamic prioritization of uplink traffic in a wireless communication network. The method includes obtaining, at a scheduled entity, a permission to delay a transmission of uplink (UL) traffic. The method further includes determining, at the scheduled entity, to delay the transmission of the UL traffic based on at least the permission, a priority level of the UL traffic and at least one channel condition measurement. The method further includes delaying the transmission of the UL traffic by skipping one or more skipped UL transmission opportunities of a plurality of UL transmission opportunities, and transmitting the UL traffic during a subsequent UL transmission opportunity of the plurality of UL transmission opportunities that is subsequent to the one or more skipped UL transmission opportunities.

In another aspect, the disclosure provides an apparatus for wireless communication that includes a processor, a memory communicatively coupled to the processor and a transceiver communicatively coupled to the processor. The processor is configured to obtain a permission to delay a transmission of uplink (UL) traffic and determine to delay the transmission of the UL traffic based on at least the permission, a priority level of the UL traffic and at least one channel condition measurement. The processor is further configured to delay the transmission of the UL traffic by skipping one or more skipped UL transmission opportunities of a plurality of UL transmission opportunities, and transmit the UL traffic during a subsequent UL transmission opportunity of the plurality of UL transmission opportunities that is subsequent to the one or more skipped UL transmission opportunities.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
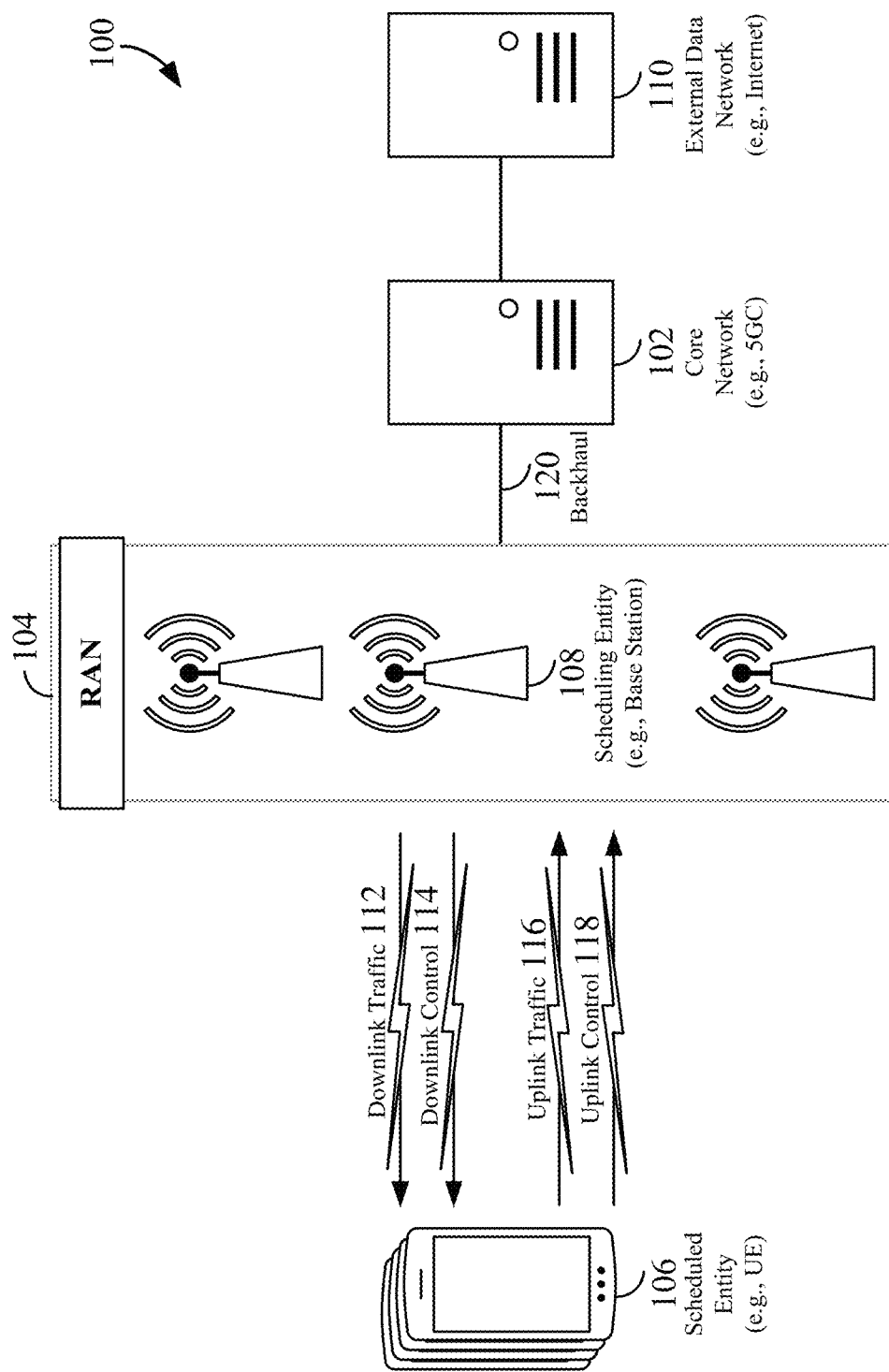
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
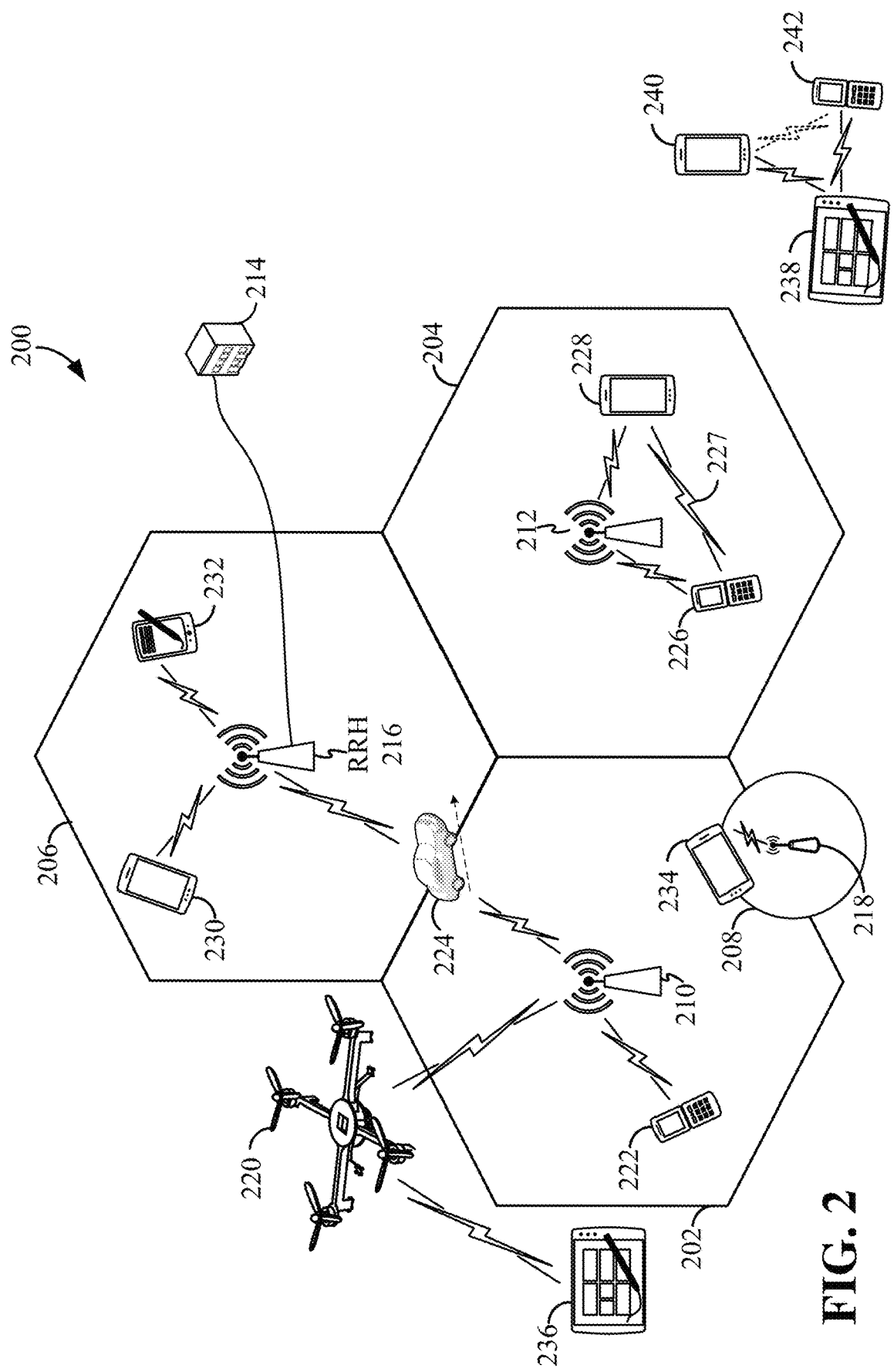
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

In some examples, an unmanned aerial vehicle (UAV) 220, which may be a quadcopter or drone 220, can be a mobile network node and may be configured to function as a base station. That is, in some examples, a cell may not necessarily be stationary, and the geographic area of the cell may move according to the location of a mobile base station such as the UAV 220. The UAV 220 may further be configured to function as a UE. For example, the UAV 220 may operate within cell 202 by communicating with base station 210.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
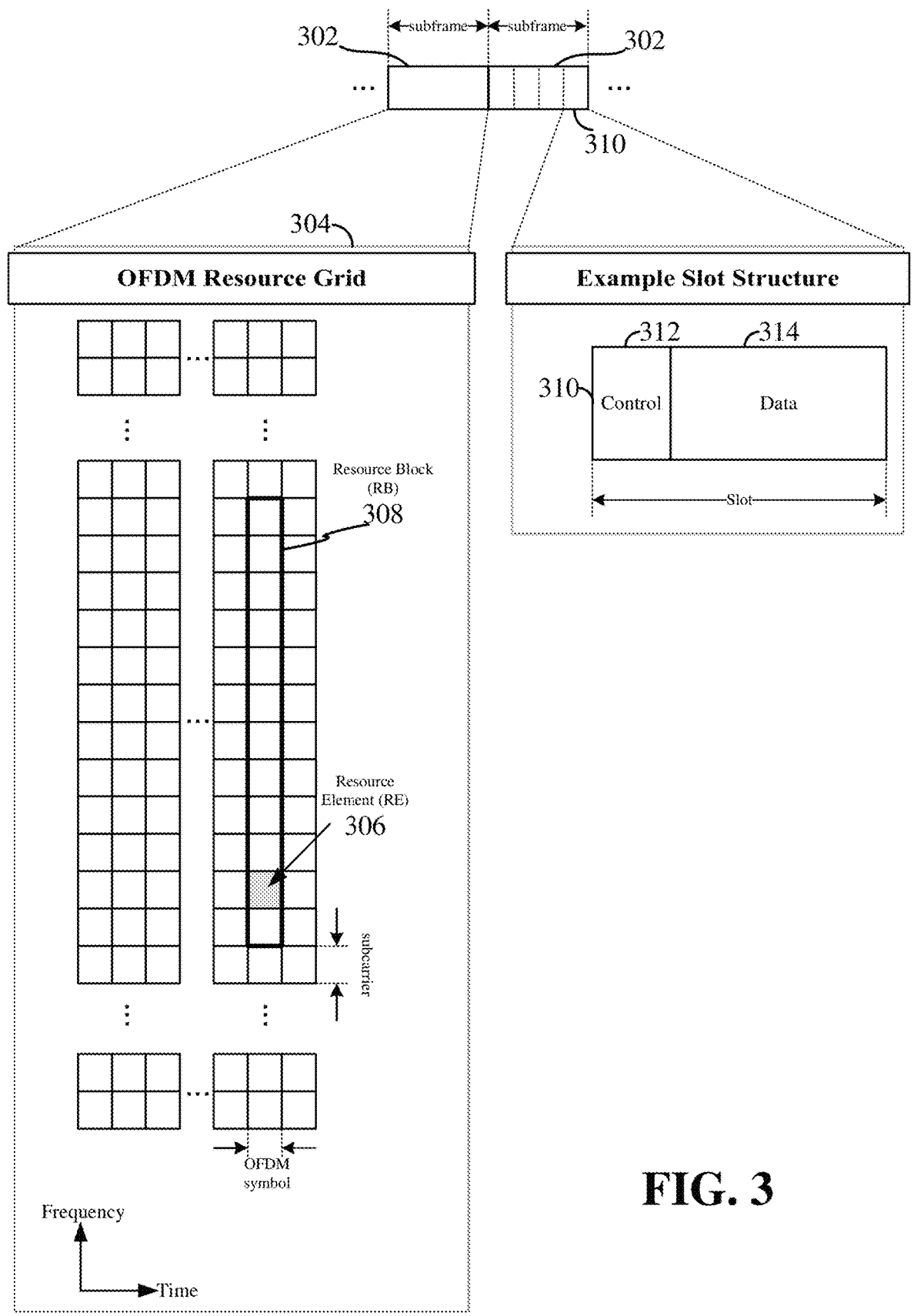
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Scheduling of uplink resources (e.g., resource elements/resource blocks) for use by scheduled entities to transmit control and/or traffic information may be performed in a dynamic manner or a semi-persistent manner. In some aspects of the disclosure, a scheduled entity may be operating in a semi-persistent scheduling (SPS) mode. In the SPS mode, radio resources may be semi-statically configured and allocated to the scheduled entity for a time period longer than one subframe. Accordingly, the need for specific downlink assignment messages or uplink grant messages over downlink control channels (e.g., PDCCH) for each subframe may be avoided. For example, the SPS mode may grant the scheduled entity permission to transmit UL traffic in certain subframes of each transmission frame (e.g., the second and eighth subframes of each transmission frame). In some configurations, the SPS mode may also limit the amount of UL traffic that the scheduled entity may transmit in each UL transmission.

Figure 4:
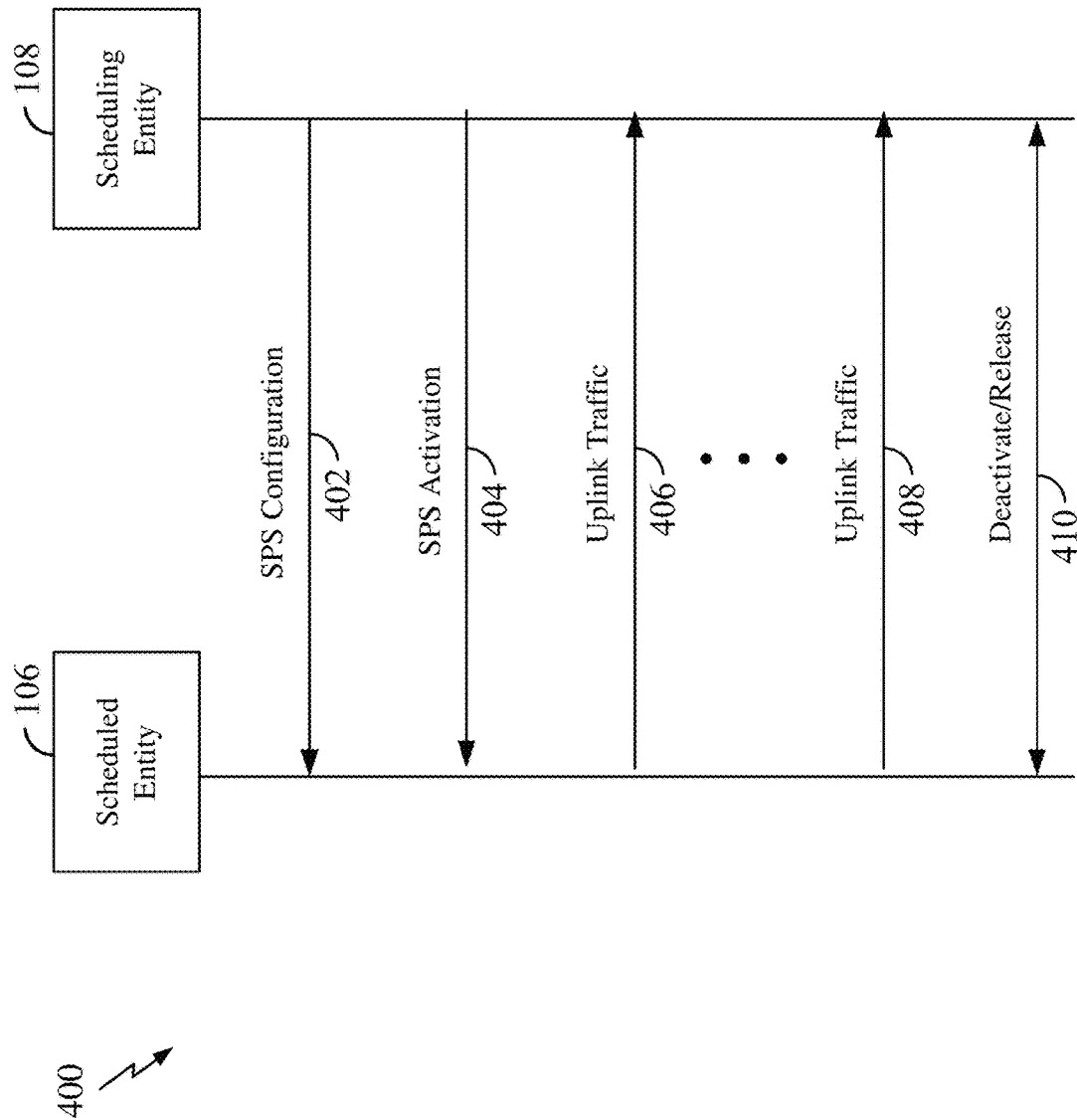
FIG. 4 is a signaling diagram illustrating exemplary signaling for semi-persistent scheduling.

FIG. 4 is a signaling diagram 400 illustrating exemplary signaling for semi-persistent scheduling (SPS) according to some aspects of the present disclosure. Generally, SPS may be used for periodic communications based on defined settings. For example, SPS may be suitable for applications with small, predictable, and/or periodic payloads. To avoid overwhelming the PDCCH, scheduling information corresponding to an uplink grant may be signaled just once on the PDCCH. Subsequently, without needing to receive additional scheduling information, the scheduled entity 106 may periodically utilize the resources allocated in the uplink grant. The periodicity with which the scheduled entity 106 may transmit user data traffic via the semi-persistently scheduled resources may be established when the SPS uplink grant is initially configured.

With reference to the diagram illustrated in FIG. 4, at 402, the scheduling entity 108 may configure SPS for a scheduled entity 106 and transmit scheduling information containing SPS configuration parameters to the scheduled entity 106. The SPS configuration message including the scheduling information may be transmitted, for example, via the PDCCH within a slot. The SPS configuration parameters may include, for example, an indication of the allocated resources for the SPS uplink grant, a semi-persistent scheduling identifier (e.g., an SPS-RNTI) for the scheduled entity 106 and a periodicity of the SPS uplink grant. The SPS-RNTI may be assigned by the scheduling entity 108 and utilized to scramble subsequent transmissions related to the SPS uplink grant. Additional SPS configuration parameters may also include, but are not limited to, an implicit release time, cyclic shift DMRS configuration, modulation and coding scheme (MCS) and/or other parameters.

The scheduling entity may configure the SPS grant at any time based on the service requirements of the scheduled entity 106 or in response to a request by the scheduled entity 106. For example, the scheduling entity 108 may configure the SPS grant based on the Quality of Service (QoS) to be provided to the scheduled entity and/or a type of traffic to be sent by the scheduling entity. In some examples, the scheduling entity 108 may configure the SPS uplink grant upon dedicated bearer establishment for a voice over Internet protocol (VoIP) service. As another example, the scheduling entity 108 may configure the SPS uplink grant to meet a low-latency QoS requirement for one or more uplink packets. SPS may be configured, for example, via a radio resource control (RRC) protocol.

Once configured, in order to begin using the SPS uplink grant, at 404, the scheduling entity 108 may then transmit an SPS activation message scrambled with the SPS-RNTI to the scheduled entity 106 to activate the SPS uplink grant and enable the scheduled entity 106 to utilize the SPS uplink grant based on the SPS configuration parameters. The SPS activation message may be transmitted, for example, via the PDCCH within a slot. At 406 and 408, the scheduled entity 106 may then utilize the assigned uplink resources to periodically transmit uplink traffic to the scheduling entity based on the periodicity of the SPS uplink grant. During periods of silence or when a data transfer is complete, at 410, the SPS uplink grant may be deactivated/released. For example, an explicit deactivation/release message may be transmitted from the scheduling entity 108 to the scheduled entity 106. In other examples, the scheduled entity 106 may initiate an inactivity timer with the implicit release time received as part of the SPS configuration parameters, and when the inactivity timer expires, the scheduled entity 106 may release the SPS uplink resources.

While the SPS uplink grant is activated, the allocated uplink resources, MCS and other SPS configuration parameters remain fixed. However, retransmissions (e.g., HARQ retransmissions) may be dynamically scheduled between SPS intervals using the SPS-RNTI. In addition, if the radio link conditions change, a new SPS uplink grant may need to be configured and activated.

In a New Radio (NR) wireless communication network, the medium access control (MAC) layer may provide more flexibility to a scheduled entity to skip uplink transmission grants in some scenarios. In such scenarios, the scheduled entity may decide to delay transmission of uplink traffic or to transmit the uplink traffic immediately. However, current mobile communication standards for NR do not specify the behavior of the scheduled entity (e.g., UE) in these scenarios.

In some aspects of the disclosure, while the scheduled entity is operating in the SPS mode, the scheduled entity may enable a power saving feature, such as connected mode discontinuous reception (C-DRX). When operating in the C-DRX mode, the scheduled entity may maintain an RRC connection with the network and may periodically monitor the downlink control channels. For example, the scheduled entity may be configured (e.g., by a scheduling entity, such as a base station) to implement a C-DRX cycle, which may include an ON duration (also referred to as a C-DRX active state) during which the scheduled entity may monitor downlink control channels and an OFF duration (also referred to as a C-DRX sleep state) during which a scheduled entity may not monitor the downlink control channels. For example, in some scenarios, the scheduled entity may power down most of its circuitry during the OFF duration of a C-DRX cycle to achieve power savings.

As described herein, when a scheduled entity is operating in the SPS and C-DRX modes, the scheduled entity may dynamically decide to interrupt the OFF duration of the C-DRX cycle to transmit UL traffic when an SPS data transmission opportunity (e.g., an SPS UL transmission grant) substantially coincides (e.g., overlaps) with the OFF duration of the C-DRX cycle. The decision to interrupt the OFF duration of the C-DRX cycle may be based on one or more factors, such as a power saving mode of the scheduled entity, a priority level of the UL traffic to be transmitted, and/or a type of the UL traffic (e.g., whether the type of the UL traffic requires immediate transmission, such as real-time data, or whether the type of the UL traffic may tolerate delays, such as Short Message Service (SMS) data).

In some aspects of the disclosure, the scheduled entity may determine to delay the transmission of UL traffic when operating in the SPS and C-DRX modes. In such aspects, the scheduled entity may refrain from transmitting the UL traffic when the scheduled entity has an SPS UL transmission grant (e.g., the scheduled entity may skip the SPS UL transmission grant) and may transmit the UL traffic at a later time (e.g., the scheduled entity may transmit the UL traffic in a subsequent SPS UL transmission grant). For example, when the scheduled entity refrains from transmitting the UL traffic, the scheduled entity may accumulate the UL traffic in its transmission buffer. The UL traffic accumulated in the transmission buffer may be transmitted during a subsequent SPS UL transmission grant based on a QoS (e.g., a priority level of the UL traffic) and/or the amount of UL traffic in the transmission buffer. For example, in some aspects of the disclosure, when the amount of UL traffic in the transmission buffer meets or exceeds a threshold, the scheduled entity may no longer continue to skip SPS UL transmission grants and may need to transmit the UL traffic accumulated in the transmission buffer during the next SPS UL transmission grant.

In some aspects of the disclosure, the scheduled entity may determine whether or not to delay an UL transmission based on one or more factors, such as a power saving indication, a priority level of the UL traffic, a delay sensitivity of the UL traffic, a volume of the UL traffic, and/or current channel conditions (e.g., radio frequency (RF) conditions). In some aspects of the disclosure, the ability of the scheduled entity to delay a UL transmission may be controlled with a parameter (e.g., a "skipULgrant" parameter) that may be enabled or disabled by the network. In one example, if the scheduled entity determines that the skipULgrant parameter is disabled, the scheduled entity may not attempt to delay UL transmissions. In such example, the scheduled entity may need to transmit the UL traffic stored in its transmission buffer at each SPS UL transmission grant. In another example, if the scheduled entity determines that the skipULgrant parameter is enabled, the scheduled entity may delay UL transmissions. It should be understood that in some aspects, when the skipULgrant parameter is enabled, the scheduled entity may dynamically determine whether or not to delay UL transmissions based on the previously described one or more factors, such as a power saving mode of the scheduled entity, a priority level of the UL traffic, a type of the UL traffic (e.g., where the type of the UL traffic indicates a delay sensitivity of the UL traffic), a volume of the UL traffic, and/or current channel conditions.

Figure 5:
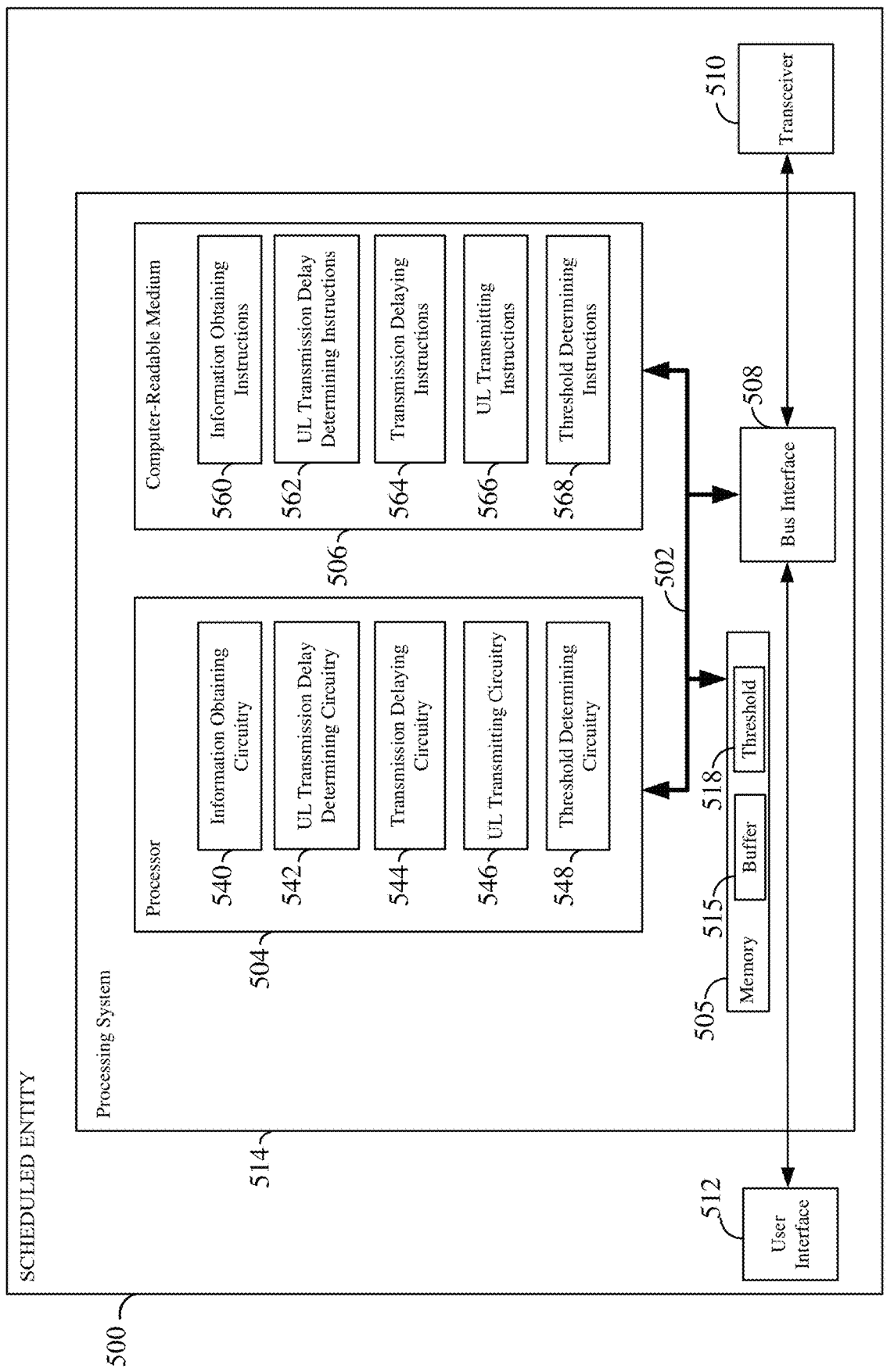
FIG. 5 is a block diagram conceptually illustrating an example of a hardware implementation for a scheduled entity employing a processing system.

FIG. 5 is a block diagram illustrating an example of a hardware implementation for a scheduled entity 500 employing a processing system 514. For example, the scheduled entity 500 may be a user equipment (UE) as illustrated in any one or more of FIGS. 1 and/or 2.

The scheduled entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 500 may be configured to perform any one or more of the functions described herein. That is, the processor 504, as utilized in a scheduled entity 500, may be used to implement any one or more of the processes and procedures described below and illustrated in FIGS. 6, 9 and/or 10.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506.

The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 504 may include circuitry configured for various functions. For example, the processor 504 may include information obtaining circuitry 540 configured for various functions, including, for example, obtaining control information (e.g., received from a base station via the transceiver 510) that includes an uplink (UL) semi-persistent scheduling (SPS) configuration and a connected mode discontinuous reception (C-DRX) configuration for the scheduled entity. The information obtaining circuitry 540 may further be configured to obtain control information (e.g., received from a base station via the transceiver 510) that includes a quality of service (QoS) for the UL traffic, in which the quality of service indicates the priority level of the UL traffic. The information obtaining circuitry 540 may further be configured to obtain a permission to delay transmission of UL traffic (e.g., received from a base station via the transceiver 510). The information obtaining circuitry 540 may further be configured to execute information obtaining instructions 560 stored on the computer-readable medium 506 to implement one or more functions described herein. For example, the information obtaining circuitry 540 may be configured to implement one or more of the functions described below in relation to FIGS. 9 and 10, including, e.g., blocks 902, 904, and 1002.

The processor 504 may further include UL transmission delay determining circuitry 542 configured for various functions, including, for example, determining to delay transmission of UL traffic based on at least a priority level of the UL traffic, a type of the UL traffic, a power saving mode of the scheduled entity, or a result of a cost function. The UL transmission delay determining circuitry 542 may further be configured to determine to delay the transmission of UL traffic based on at least a permission, a priority level of the UL traffic and at least one channel condition measurement. The UL transmission delay determining circuitry 542 may further be configured to execute UL transmission delay determining instructions 562 stored on the computer-readable medium 506 to implement one or more functions described herein. For example, the UL transmission delay determining circuitry 542 may be configured to implement one or more of the functions described below in relation to FIGS. 9 and 10, including, e.g., blocks 906 and 1008.

The processor 504 may further include transmission delaying circuitry 544 configured for various functions, including, for example, delaying the transmission of the UL traffic by skipping one or more of a plurality of UL transmission opportunities and/or delaying transmission of a buffer status report (BSR) and a scheduling request (SR) based on one or more quality of service (QoS) parameters. The transmission delaying circuitry 544 may further be configured to execute transmission delaying instructions 564 stored on the computer-readable medium 506 to implement one or more functions described herein. For example, the transmission delaying circuitry 544 may be configured to implement one or more of the functions described below in relation to FIGS. 9 and 10, including, e.g., blocks 908, 1010, and 1014.

The processor 504 may further include UL transmitting circuitry 546 configured for various functions, including, for example, transmitting the UL traffic during a UL transmission opportunity that is subsequent to the skipped one or more UL transmission opportunities. The UL transmitting circuitry 546 may further be configured to access a transmission buffer 515 (e.g., a MAC buffer) that may be maintained, for example, in memory 505 to retrieve the UL traffic for transmission. The UL transmitting circuitry 546 may further be configured to execute UL transmitting instructions 566 stored on the computer-readable medium 506 to implement one or more functions described herein. For example, the UL transmitting circuitry 546 may be configured to implement one or more of the functions described below in relation to FIGS. 9 and 10, including, e.g., blocks 910 and 1012.

The processor 504 may further include threshold determining circuitry 548 configured for various functions, including, for example, determining at least one threshold 518 that may be maintained, for example, in memory 505. In some examples, the at least one threshold 518 may correspond to the at least one channel condition measurement. In some examples, the at least one threshold 518 may include a delay threshold for the UL traffic, a threshold priority level for the UL traffic, or a buffer threshold for the transmission buffer 515. The threshold determining circuitry 548 may further be configured to execute threshold determining instructions 568 stored on the computer-readable medium 506 to implement one or more functions described herein. For example, the threshold determining circuitry 548 may be configured to implement one or more of the functions described below in relation to FIGS. 9 and 10, including, e.g., blocks 1004 and 1006.

Figure 6:
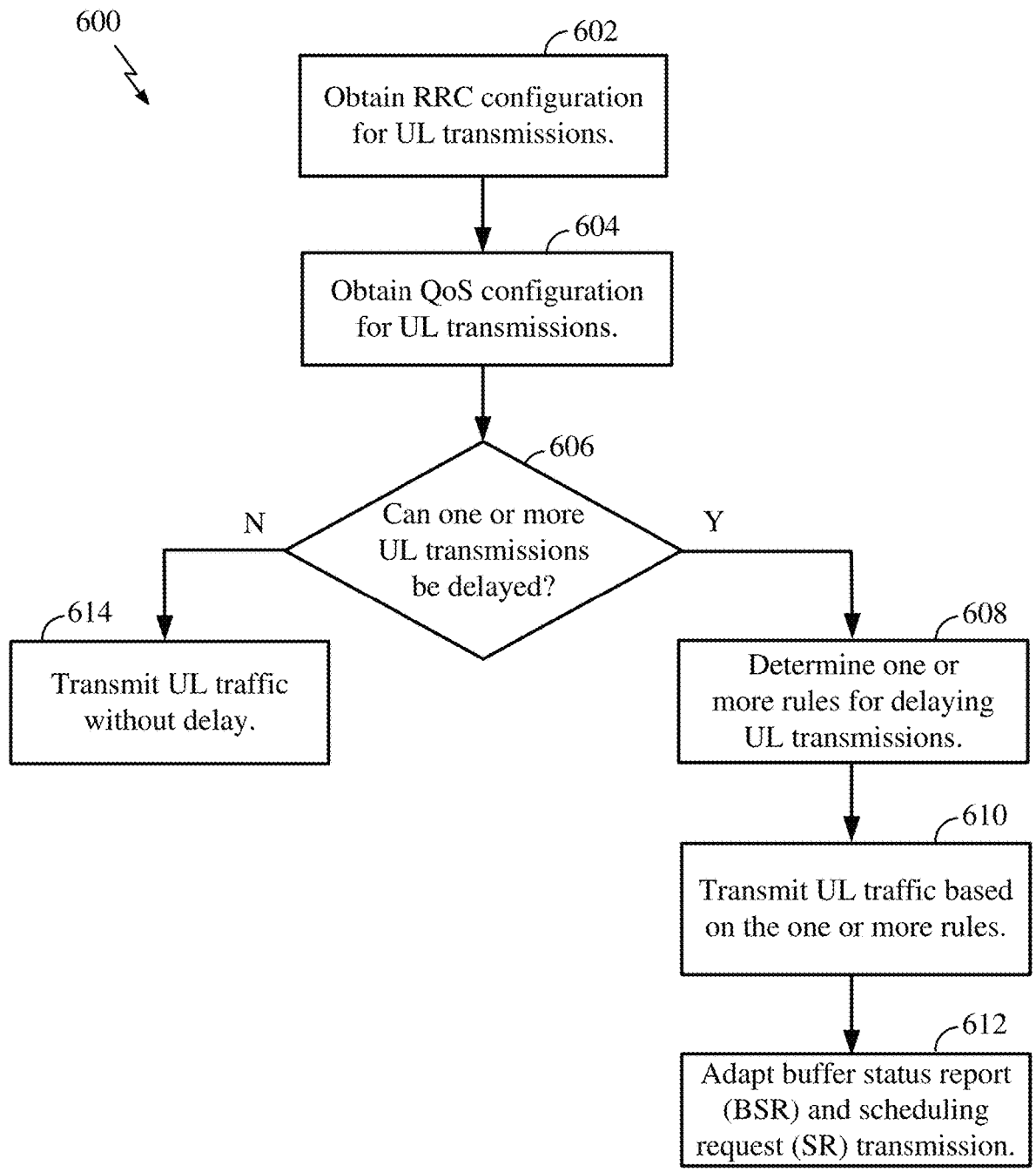
FIG. 6 is a flow chart illustrating an exemplary process for dynamic prioritization of uplink traffic.

FIG. 6 is a flow chart illustrating an exemplary process 600 for dynamic prioritization of UL traffic. As described below, some or all illustrated features may be omitted in a particular implementation within the scope of the present disclosure, and some illustrated features may not be required for implementation of all embodiments. In some examples, the process 600 may be carried out by the scheduled entity 500 illustrated in FIG. 5, by a processor or processing system, or by any suitable apparatus or means for carrying out the functions or algorithm described below.

At block 602, the scheduled entity may obtain an RRC configuration for UL transmissions. In some examples, the RRC configuration may indicate an UL SPS configuration for the scheduled entity, an indication whether the scheduled entity is allowed to skip one or more UL transmission grants provided by the UL SPS configuration, and/or a C-DRX configuration for the scheduled entity. For example, the RRC configuration may indicate whether the scheduled entity is allowed to skip one or more UL grants by enabling or disabling a parameter, such as a "skipULgrant" parameter. For example, the information obtaining circuitry 540, in conjunction with the transceiver 510, shown and described above in connection with FIG. 5 may obtain the RRC configuration.

At block 604, the scheduled entity may obtain a QoS configuration for UL transmissions. In some examples, the QoS configuration may indicate a priority level (also referred to as a priority value) for UL traffic to be transmitted. For example, the QoS configuration may indicate that UL traffic of a first data flow may have a low priority level, UL traffic of a second data flow may have a medium priority level, and UL traffic of a third data flow may have a high priority level. For example, the first data flow may include UL traffic that is least sensitive to delays (e.g., Short Message Service (SMS) data) whereas the third data flow may include UL traffic that is most sensitive to delays, such as real-time data (e.g., gaming or video data). For example, the information obtaining circuitry 540, in conjunction with the transceiver 510, shown and described above in connection with FIG. 5 may obtain the QoS configuration.

At block 606, the scheduled entity may determine whether one or more UL transmissions can be delayed. In some examples, the scheduled entity may determine whether one or more UL transmissions can be delayed based on at least the skipULgrant parameter. For example, the scheduled entity may determine that one or more UL transmissions can be delayed when the skipULgrant parameter is enabled. For example, the UL transmission delay determining circuitry 542 shown and described above in connection with FIG. 5 may determine whether one or more UL transmissions can be delayed.

If one or more UL transmissions can be delayed (Y branch of block 606), at block 608, the scheduled entity may determine one or more rules for delaying UL transmissions. In some examples, the one or more rules for delaying UL transmissions may include a set of thresholds for channel condition measurements. For example, the scheduled entity may determine a first threshold for a reference signal received power (RSRP), a second threshold for a reference signal received quality (RSRQ), a third threshold for a reference signal strength indicator (RSSI), and/or a fourth threshold for a signal-to-noise ratio (SNR). In this example, if the scheduled entity determines that the channel condition measurements meet or exceed the set of thresholds for channel condition measurements (e.g., the previously described first, second, third, and/or fourth thresholds), the scheduled entity may not delay the UL transmission. Otherwise, if the scheduled entity determines that the channel condition measurements do not meet or exceed the set of thresholds for channel condition measurements, the scheduled entity may delay the UL transmission until the channel conditions are improved (e.g., until the channel condition measurements meet or exceed the set of thresholds for the channel condition measurements).

In some examples, the one or more rules for delaying UL transmissions may be based on a priority level of the UL traffic to be transmitted. For example, as previously discussed, the QoS configuration may indicate that UL traffic of a first data flow may have a low priority level, UL traffic of a second data flow may have a medium priority level, and UL traffic of a third data flow may have a high priority level. In this example, UL traffic of the first and second data flows may be delayed but UL traffic of the third data flow may not be delayed. Continuing with this example, UL traffic of the first data flow may be transmitted when an SPS UL transmission grant substantially coincides with the ON duration of a C-DRX cycle. UL traffic of the second data flow may be dynamically held or transmitted during an SPS UL transmission grant based on channel conditions (e.g., when the channel condition measurements meet or exceed the set of thresholds for channel condition measurements as previously described) and/or other factors as described herein. UL traffic of the third data flow may need to be transmitted at each UL transmission opportunity (e.g., at each SPS UL transmission grant). For example, with respect to the other factors for dynamically holding or transmitting UL traffic of the second data flow, the scheduled entity may be configured to hold UL traffic of the second data flow until a threshold amount of UL traffic is stored in the transmission buffer of the scheduled entity. Once the threshold amount is met or exceeded, the scheduled entity may transmit the UL traffic stored in the transmission buffer in the next transmission opportunity (e.g., the next SPS UL transmission grant) even if the next SPS UL transmission grant substantially coincides with an OFF duration of a C-DRX cycle. For example, the transmission delaying circuitry 544 and threshold determining circuitry 548 shown and described above in connection with FIG. 5 may determine the one or more rules for delaying UL transmissions.

At block 610, the scheduled entity may transmit UL traffic based on the previously described one or more rules for delaying UL transmissions. For example, the UL transmitting circuitry 546 shown and described above in connection with FIG. 5 may transmit the UL traffic based on the rules.

At block 612, the scheduled entity may adapt a buffer status report (BSR) and a scheduling request (SR) transmission based on the decision to delay UL transmissions. For example, the scheduled entity may delay transmission of the BSR and SR by one or more subframes based on one or more QoS parameters (e.g., priority values). For example, in some aspects of the disclosure, different data flows may be mapped to the same MAC entity and each data flow may have an absolute priority relative to the other data flows. For example, for data flows with a high priority value (e.g., a priority value 1 indicating the highest priority), SR transmission from the scheduled entity may be immediate and the total BSR buffer size may indicate the total required UL transmission grant. For data flows with a lower priority value, however, the SR transmission from the scheduled entity may be delayed until a threshold amount of data is accumulated. For example, for a data flow with a low priority value (e.g., a priority value 5 indicating the lowest priority), the scheduled entity may delay transmission of SR and/or BSR until the total buffer size meets or exceeds a threshold amount (e.g., 500 kilobytes). If one or more UL transmissions cannot be delayed (e.g., at block 606), then at block 614, the scheduled entity may transmit the UL traffic without delay (e.g., during the next available SPS grant).

Figure 7:
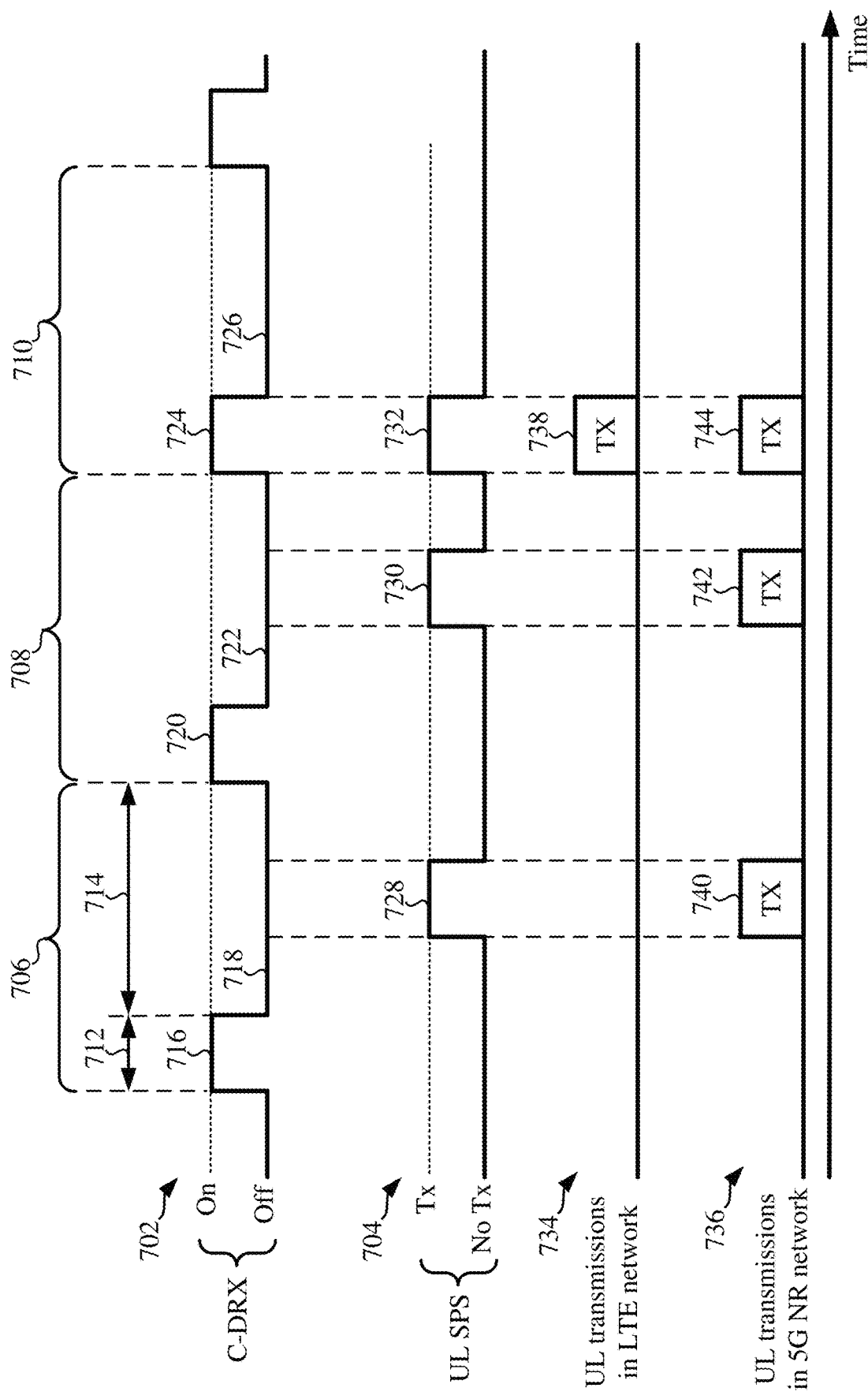
FIG. 7 is a diagram illustrating exemplary UL transmissions from a scheduled entity operating in an uplink (UL) semi-persistent scheduling (SPS) mode and a connected mode discontinuous reception (C-DRX) mode.

FIG. 7 is a diagram illustrating exemplary UL transmissions from a scheduled entity operating in the UL SPS mode and the C-DRX mode. FIG. 7 includes an exemplary C-DRX configuration 702 and an exemplary UL SPS configuration 704. The C-DRX configuration 702 shown in FIG. 7 includes three C-DRX cycles 706, 708, and 710. In FIG. 7, the portion 716 represents an ON duration of the C-DRX cycle 706 and the portion 718 represents an OFF duration of the C-DRX cycle 706, the portion 720 represents an ON duration of the C-DRX cycle 708 and the portion 722 represents an OFF duration of the C-DRX cycle 708, and the portion 724 represents an ON duration of the C-DRX cycle 710 and the portion 726 represents an OFF duration of the C-DRX cycle 710. For example, with reference to C-DRX cycle 706, the duration 712 of the ON duration may be 20 milliseconds (ms) and the duration 714 of the OFF duration may be 70 ms.

As shown in FIG. 7, the UL SPS transmission configuration 704 includes a first SPS transmission period 728, a second SPS transmission period 730, and a third SPS transmission period 732. The SPS transmission periods 728, 730, and 732 may also be referred to as UL SPS transmission opportunities or SPS UL transmission grants. As further shown in FIG. 7, the first SPS transmission period 728 substantially coincides with the OFF duration of the C-DRX cycle 706, the second SPS transmission period 730 substantially coincides with the OFF duration of the C-DRX cycle 708, and the third SPS transmission period 732 substantially coincides (e.g., overlaps) with the ON duration of C-DRX cycle 710.

In LTE mobile communication networks, a scheduled entity is allowed to transmit UL traffic only during an ON duration of a C-DRX cycle. Moreover, a scheduled entity is required to transmit UL traffic regardless of whether or not the buffer of the scheduled entity contains data. For example, FIG. 7 shows exemplary UL transmissions 734 in an LTE network from a scheduled entity operating simultaneously in both the C-DRX and UL SPS modes. The scheduled entity is not allowed to transmit UL traffic during the first SPS transmission period 728 and the second SPS transmission period 730 because these SPS transmission periods substantially coincide with OFF durations of the respective C-DRX cycles 706 and 708. As shown in FIG. 7, the scheduled entity is allowed to transmit UL traffic 738 during the third SPS transmission period 732 because the third SPS transmission period 732 substantially coincides with the ON duration of the C-DRX cycle 710.

In 5G NR mobile communication networks, a scheduled entity may transmit UL traffic during the OFF duration of a C-DRX cycle. For example, if the scheduled entity is operating in the UL SPS mode and the C-DRX mode, the scheduled entity may transmit UL traffic when a UL SPS transmission period substantially coincides with an OFF duration of a C-DRX cycle. In some scenarios, the scheduled entity in the 5G NR mobile communication network has the choice to transmit UL traffic or not to transmit the UL traffic. In such scenarios, the scheduled entity may refrain (e.g., hold) from transmitting the UL traffic even if the scheduled entity has an SPS UL transmission grant. For example, FIG. 7 shows exemplary UL transmissions 736 in a 5G NR network from a scheduled entity operating in the C-DRX and UL SPS modes. The scheduled entity is allowed to transmit UL traffic 740 during the first SPS transmission period 728 and to transmit UL traffic 742 during the second SPS transmission period 730 despite that these SPS transmission periods substantially coincide with OFF durations of the respective C-DRX cycles 706 and 708. As shown in FIG. 7, the scheduled entity is also allowed to transmit UL traffic 744 during the third SPS transmission period 732.

Figure 8:
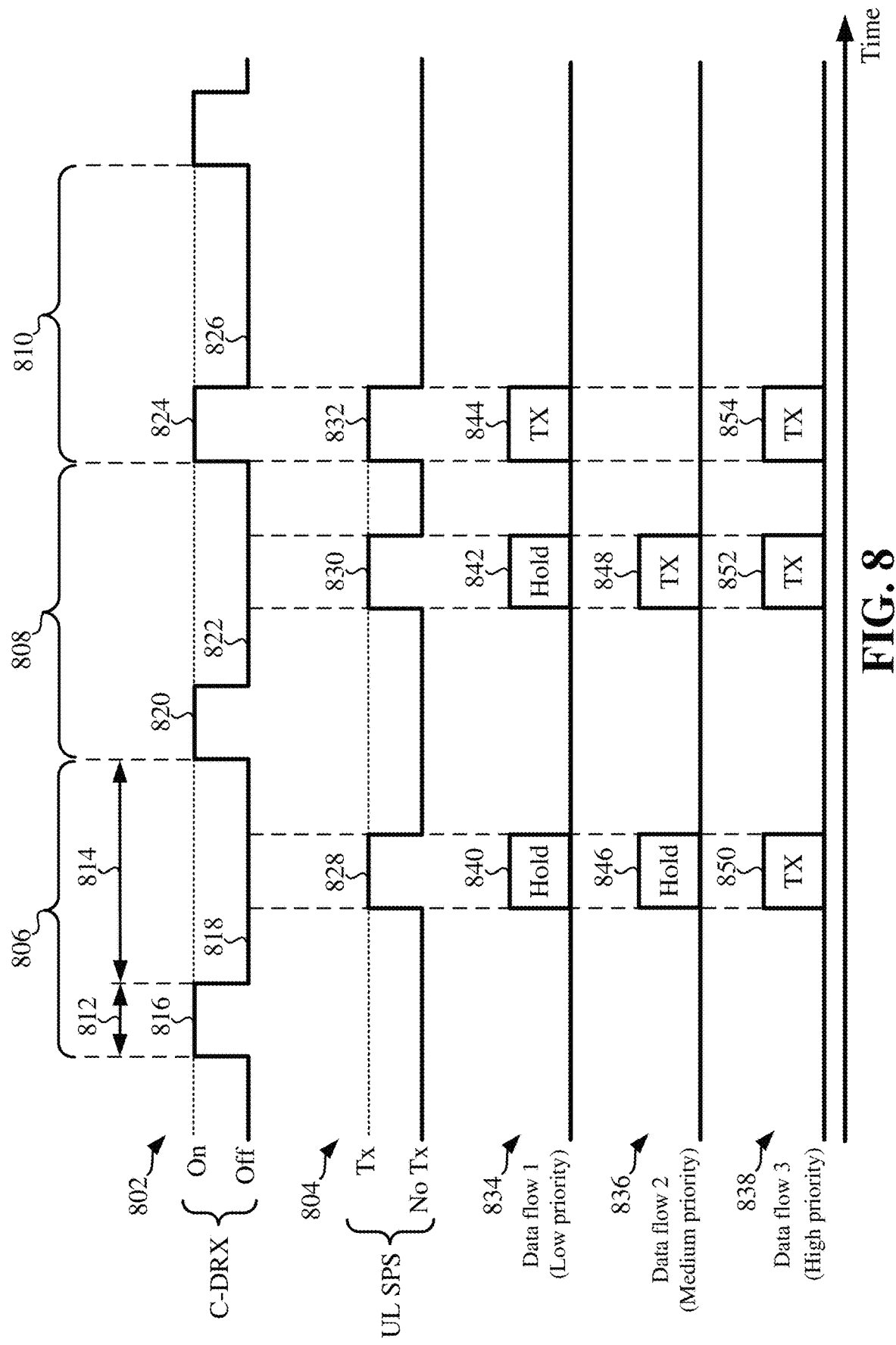
FIG. 8 is a diagram illustrating exemplary UL transmissions from a scheduled entity operating in the UL SPS mode and the C-DRX mode.

FIG. 8 is a diagram illustrating exemplary UL transmissions from a scheduled entity (e.g., the scheduled entity 500) operating in the UL SPS mode and the C-DRX mode. The scheduled entity may be operating in a 5G NR network. FIG. 8 includes an exemplary C-DRX configuration 802 and an exemplary UL SPS transmission configuration 804. The C-DRX configuration 802 shown in FIG. 8 includes three C-DRX cycles 806, 808, and 810. In FIG. 8, the portion 816 represents an ON duration of the C-DRX cycle 806 and the portion 818 represents an OFF duration of the C-DRX cycle 806, the portion 820 represents an ON duration of the C-DRX cycle 808 and the portion 822 represents an OFF duration of the C-DRX cycle 808, and the portion 824 represents an ON duration of the C-DRX cycle 810 and the portion 826 represents an OFF duration of the C-DRX cycle 810. For example, with reference to C-DRX cycle 806, the duration 812 of the ON duration may be 20 ms and the duration 814 of the OFF duration may be 60 ms.

As shown in FIG. 8, the UL SPS transmission configuration 804 includes a first SPS transmission period 828, a second SPS transmission period 830, and a third SPS transmission period 832. The SPS transmission periods 828, 830, and 832 may also be referred to as UL SPS transmission opportunities or SPS UL transmission grants. As further shown in FIG. 8, the first SPS transmission period 828 substantially coincides with the OFF duration of the C-DRX cycle 806, the second SPS transmission period 830 substantially coincides with the OFF duration of the C-DRX cycle 808, and the third SPS transmission period 832 substantially coincides (e.g., overlaps) with the ON duration of C-DRX cycle 810.

In some examples, the scheduled entity may transmit UL traffic from multiple data flows. In such examples, each of the multiple data flows may have a different priority level. For example, a first data flow (referred to as data flow 1 834 in FIG. 8) may have a low priority level, a second data flow (referred to as data flow 2 836 in FIG. 8) may have a medium priority level, and a third data flow (referred to as data flow 3 838 in FIG. 8) may have a high priority level. As shown in FIG. 8, the scheduled entity may transmit UL traffic of the first data flow when a UL SPS transmission period substantially coincides with an ON duration of a C-DRX cycle. Accordingly, in the example of FIG. 8, the scheduled entity may transmit 844 UL traffic of the first data flow when the third SPS transmission period 832 substantially coincides (e.g., overlaps) with the ON duration of the C-DRX cycle 810. When a UL SPS transmission period does not coincide with an ON duration of a C-DRX cycle, the scheduled entity may not transmit the UL traffic of the first data flow. For example, as shown in FIG. 8, when UL traffic of the first data flow is ready to be transmitted during the first SPS transmission period 828, the scheduled entity may hold 840 the UL traffic because the first SPS transmission period 828 substantially coincides with the OFF duration of the C-DRX cycle 806. As another example, when UL traffic of the first data flow is ready to be transmitted during the second SPS transmission period 830, the scheduled entity may hold 842 the UL traffic because the second SPS transmission period 830 substantially coincides with the OFF duration of the C-DRX cycle 808. Therefore, in the examples above, the scheduled entity may delay transmission of UL traffic by skipping the first and second SPS transmission periods 828, 830 and by transmitting the UL traffic during the third SPS transmission period 832 that is subsequent to the skipped first and second SPS transmission periods 828, 830.

In some examples, each of the multiple data flows may be associated with a maximum delay time. For example, the maximum delay time may indicate the time period that UL traffic may be held after arriving at the MAC buffer (e.g., transmission buffer) of the scheduled entity. Once the maximum delay time is reached, the scheduled entity may need to transmit the UL traffic in the MAC layer in the next transmission opportunity (e.g., in the next SPS UL transmission grant), regardless of channel conditions and/or other factors.

As shown in FIG. 8, the scheduled entity may dynamically hold or transmit UL traffic of the second data flow based on one or more factors. In some examples, such factors may include channel conditions (e.g., RF conditions) and/or a power saving mode of the scheduled entity. It should be understood that the scheduled entity may transmit UL traffic of the second data flow either when a UL SPS transmission period substantially coincides with an ON duration of a C-DRX cycle or when a UL SPS transmission period substantially coincides with an OFF duration of a C-DRX cycle. Accordingly, in the example of FIG. 8, when UL traffic of the second data flow is ready to be transmitted during the first SPS transmission period 828 and channel conditions are poor and/or the scheduled entity is operating in a low power mode, the scheduled entity may hold 846 the UL traffic of the second data flow for transmission at a later time. In this example, the scheduled entity may transmit 848 the held UL traffic during the second SPS transmission period 830 when channel conditions are acceptable (e.g., when at least one channel condition measurement meets or exceeds a threshold) and/or the scheduled entity is no longer operating in a low power mode. In the aspects described herein, the low power mode (also referred to as power savings mode) refers to a mode of operation where the scheduling entity is configured to reduce UL transmissions (e.g., by delaying UL transmissions and subsequently transmitting the delayed UL traffic together in a single transmission). For example, if the scheduled entity has four UL transmissions that are each 1 kilobyte in size, it may be more power efficient for the scheduled entity to transmit a single UL transmission that is 4 kilobytes in size. It should be noted that the scheduled entity may transmit 848 UL traffic of the second data flow when the second SPS transmission period 830 substantially coincides (e.g., overlaps) with the OFF duration of the C-DRX cycle 808.

As shown in FIG. 8, the scheduled entity may transmit UL traffic of the third data flow when a UL SPS transmission period substantially coincides with an ON duration of a C-DRX cycle and when a UL SPS transmission period substantially coincides with an OFF duration of a C-DRX cycle. In other words, the scheduled entity may transmit UL traffic (e.g., UL transmissions 850, 852, and 854 in FIG. 8) of the third data flow in all instants a UL SPS transmission grant is available. For example, the scheduled entity may transmit UL traffic of the third data flow during the first SPS transmission period 828, the second SPS transmission period 830, and the third SPS transmission period 832.

In some examples, if the scheduled entity determines that the SkipULgrant parameter is enabled, the scheduled entity may hold (e.g., refrain from transmitting) or transmit UL traffic based on a priority level of the UL traffic and the current channel conditions (e.g., current RF conditions). In some examples, the scheduled entity may determine one or more delay thresholds for UL traffic. For example, the delay threshold may be a maximum number of subframes that the UL traffic can be delayed or a maximum number of SPS UL transmission grants that may be skipped. In this example, the scheduled entity may need to transmit the UL traffic before exceeding the maximum number of subframes or the maximum number of skipped SPS UL transmission grants. In some examples, if the scheduled entity determines that the SkipULgrant parameter is enabled, the scheduled entity may adaptively select a channel condition threshold for determining whether to hold or transmit UL traffic.

In some examples, the scheduled entity may adjust buffer status reporting in cases where the scheduled entity refrains from transmitting UL traffic until future transmission opportunities. For example, the scheduled entity may not transmit an SR every time the scheduled entity has new UL traffic to transmit. Accordingly, in some of the aspects described herein, the scheduled entity may be configured to delay transmission of the SR, with the expectation of accumulating more UL traffic prior to transmitting the SR. For example, a BSR may indicate the amount of UL traffic in the transmission buffer of the scheduled entity. In some of the aspects described herein, the scheduled entity may be configured to modify a BSR to indicate an amount of UL traffic that is lower than the actual amount of UL traffic in the transmission buffer of the scheduled entity. For example, the scheduled entity may modify a BSR to indicate that the transmission buffer is empty, despite that some amount of UL traffic is present in the transmission buffer. In such aspects, this approach may prevent the network (e.g., a base station) from providing a UL transmission grant in the next transmission time interval (e.g., subframe), thereby allowing the scheduled entity to accumulate more UL traffic for later transmissions with a larger BSR.

Figure 9:
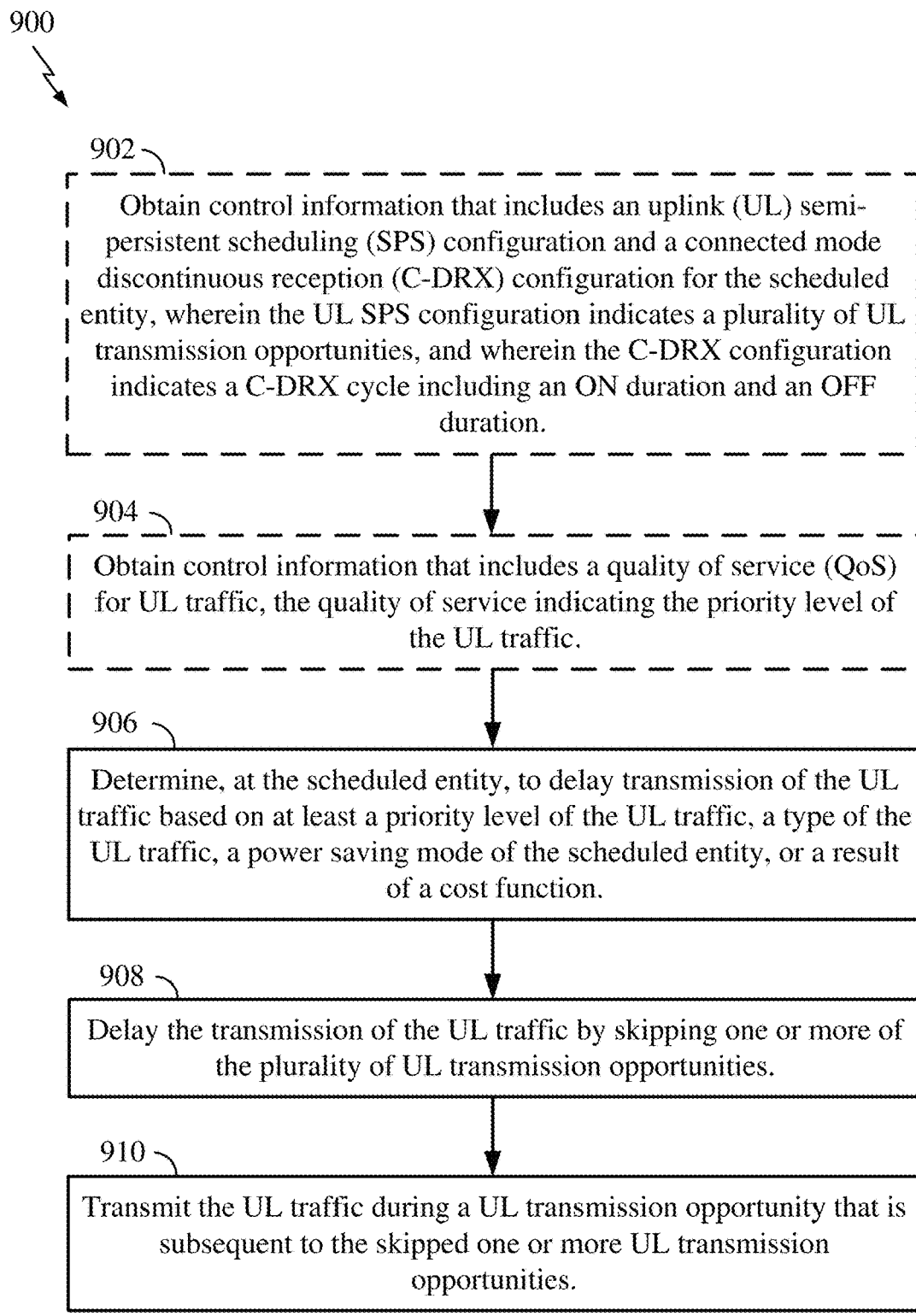
FIG. 9 is a flow chart illustrating another exemplary process for dynamic prioritization of uplink traffic.

FIG. 9 is a flow chart illustrating another exemplary process 900 for dynamic prioritization of UL traffic. As described below, some or all illustrated features may be omitted in a particular implementation within the scope of the present disclosure, and some illustrated features may not be required for implementation of all embodiments. In some examples, the process 900 may be carried out by the scheduled entity 500 illustrated in FIG. 5, by a processor or processing system, or by any suitable apparatus or means for carrying out the functions or algorithm described below. It should be understood that blocks indicated with dashed lines represent optional blocks.

At block 902, the scheduled entity may optionally obtain control information that includes a UL SPS configuration and a C-DRX configuration for the scheduled entity. The UL SPS configuration may indicate a plurality of UL transmission opportunities, and the C-DRX configuration may indicate a C-DRX cycle including an ON duration and an OFF duration. In some examples, the plurality of UL transmission opportunities are UL SPS transmission grants. At block 904, the scheduled entity may optionally obtain control information that includes a QoS for the UL traffic, the quality of service indicating the priority level of the UL traffic. For example, the information obtaining circuitry 540, in conjunction with the transceiver 510, shown and described above in connection with FIG. 5 may obtain the control information in blocks 902 and 904.

At block 906, the scheduled entity may determine to delay transmission of UL traffic based on at least a priority level of the UL traffic, a type of the UL traffic, a power saving mode of the scheduled entity, or a result of a cost function. In some examples, the determination to delay transmission of the UL traffic includes determining that the priority level of the UL traffic is below a threshold priority level. In some examples, the priority level of the UL traffic is one of a first priority level or a second priority level, and when the threshold priority level is a third priority level, the first and second priority levels are lower than the third priority level. In some examples, the determination to delay transmission of the UL traffic includes determining that the type of the UL traffic is not delay sensitive. In some examples, the determination to delay transmission of the UL traffic further includes determining that the power saving mode (e.g., OFF duration of C-DRX cycle) of the scheduled entity is enabled. In some examples, the determination to delay transmission of the UL traffic further includes determining that the result of the cost function exceeds a threshold. For example, a cost function may be a function for determining a maximum power saving (e.g., in terms of milliamperes (mA)) given the following constraints: (1) three data flows with different relative priority; (2) each UL transmission is approximately equal in terms of power consumption (3) and the block error rate (BLER) to be maintained to 10%. For example, the UL transmission delay determining circuitry 542 and threshold determining circuitry 548 shown and described above in connection with FIG. 5 may determine to delay transmission of UL traffic.

At block 908, the scheduled entity may delay the transmission of the UL traffic by skipping one or more of a plurality of UL transmission opportunities. In some examples, a delay resulting from skipping the one or more of the plurality of UL transmission opportunities is less than or equal to a maximum delay time associated with the UL traffic. For example, the transmission delaying circuitry 544 shown and described above in connection with FIG. 5 may delay the transmission of the UL traffic.

At block 910, the scheduled entity may transmit the UL traffic during a UL transmission opportunity that is subsequent to the skipped one or more UL transmission opportunities. In some examples, the UL transmission opportunity that is subsequent to the skipped one or more UL transmission opportunities substantially coincides with the OFF duration of the C-DRX cycle when the priority level of the UL traffic meets or exceeds a threshold priority level or when an amount of the UL traffic stored in the transmission buffer exceeds a threshold regardless of the priority level of the UL traffic. In some examples, the UL transmission opportunity that is subsequent to the skipped one or more UL transmission opportunities substantially coincides with the ON duration of the C-DRX cycle when the priority level of the UL traffic is below a threshold priority level or when the power saving mode of the scheduled entity is enabled. For example, the UL transmitting circuitry 546 shown and described above in connection with FIG. 5 may transmit the UL traffic.

Figure 10:
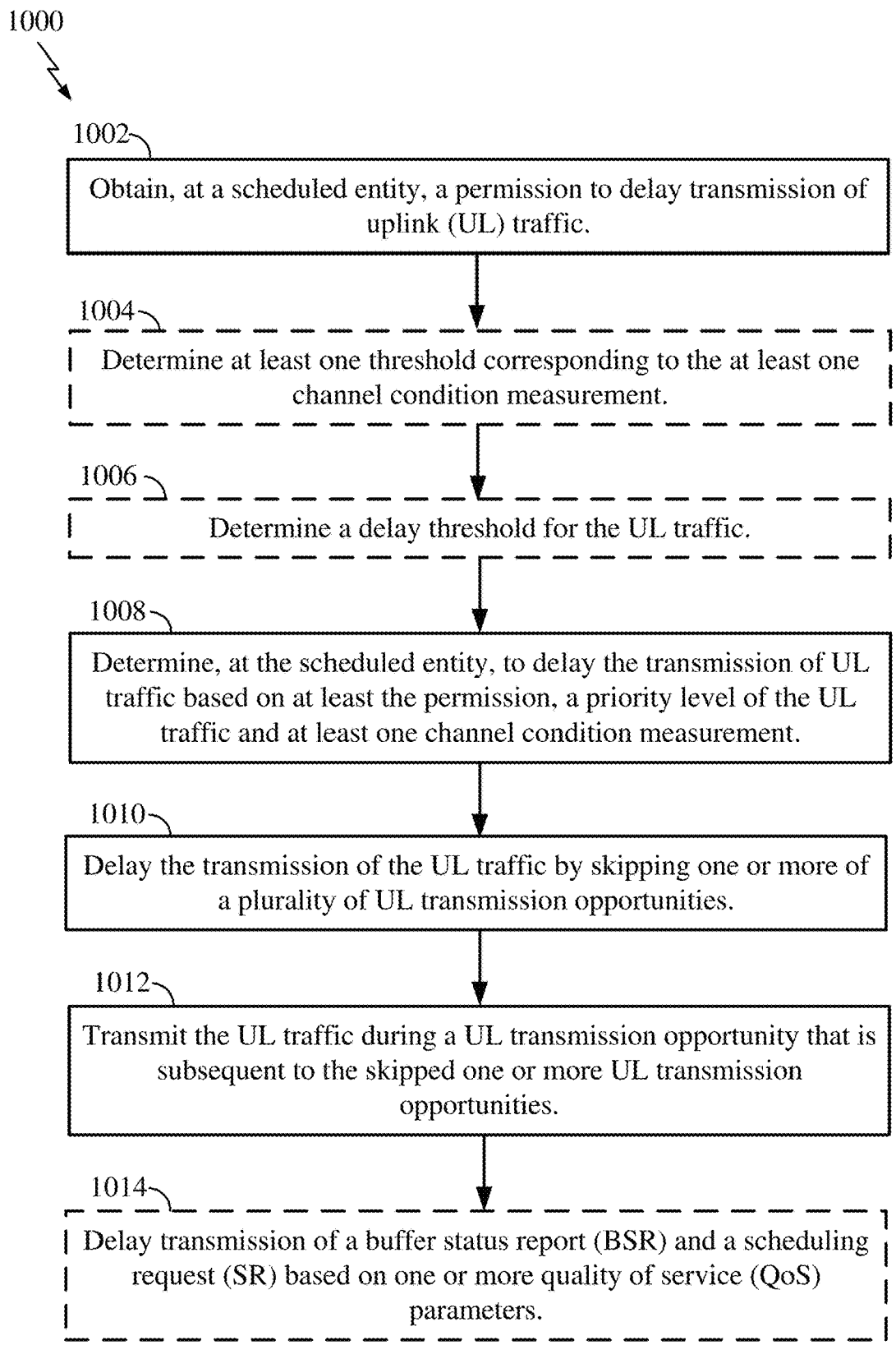
FIG. 10 is a flow chart illustrating another exemplary process for dynamic prioritization of uplink traffic.

FIG. 10 is a flow chart illustrating another exemplary process 1000 for dynamic prioritization of UL traffic. As described below, some or all illustrated features may be omitted in a particular implementation within the scope of the present disclosure, and some illustrated features may not be required for implementation of all embodiments. In some examples, the process 1000 may be carried out by the scheduled entity 500 illustrated in FIG. 5, by a processor or processing system, or by any suitable apparatus or means for carrying out the functions or algorithm described below. It should be understood that blocks indicated with dashed lines represent optional blocks.

At block 1002, the scheduled entity may obtain a permission to delay transmission of uplink (UL) traffic. For example, the permission may be obtained by receiving an enabled skipULgrant parameter from the network. For example, the information obtaining circuitry 540 shown and described above in connection with FIG. 5 may obtain permission to delay transmission of UL traffic.

At block 1004, the scheduled entity may determine at least one threshold corresponding to the at least one channel condition measurement. At block 1006, the scheduled entity may determine a delay threshold for the UL traffic. In some examples, the delay threshold is a maximum number of subframes or a maximum number of skipped UL transmission opportunities. For example, the threshold determining circuitry 548 shown and described above in connection with FIG. 10 may determine the thresholds.

At block 1008, the scheduled entity may determine to delay the transmission of UL traffic based on at least the permission, a priority level of the UL traffic and at least one channel condition measurement. For example, the UL transmission delay determining circuitry 542 shown and described above in connection with FIG. 5 may determine to delay the transmission of UL traffic.

At block 1010, the scheduled entity may delay the transmission of the UL traffic by skipping one or more of a plurality of UL transmission opportunities. For example, the transmission delaying circuitry 544 shown and described above in connection with FIG. 5 may delay the transmission of the UL traffic.

At block 1012, the scheduled entity transmits the UL traffic during a UL transmission opportunity that is subsequent to the skipped one or more UL transmission opportunities. In some examples, the UL traffic is transmitted prior to exceeding the delay threshold. For example, the UL transmitting circuitry 546 shown and described above in connection with FIG. 5 may transmit the UL traffic.

At block 1014, the scheduled entity may delay transmission of a BSR and an SR based on one or more QoS parameters. In some examples, the determination of at least one threshold corresponding to the at least one channel condition measurement includes determining at least a first threshold for an RSRP, a second threshold for an RSRQ, a third threshold for an RSSI, or a fourth threshold for an SNR. In some examples, the determination of at least one threshold corresponding to the at least one channel condition measurement includes determining at least a first threshold for an RSRP, a second threshold for an RSRQ, a third threshold for an RSSI, or a fourth threshold for an SNR. In some examples, the determination to delay the transmission of UL traffic includes determining that the priority level of the UL traffic is below a threshold priority level and that the at least one channel condition measurement is below the at least one threshold corresponding to the at least one channel condition measurement. In some examples, the determination to delay the transmission of UL traffic is further based on an amount of the UL traffic in a transmission buffer of the scheduled entity, and wherein the determining to delay the transmission of UL traffic includes determining that the priority level of the UL traffic is below a threshold priority level and that the amount of the UL traffic stored in the transmission buffer is below a threshold. For example, the transmission delaying circuitry 544 shown and described above in connection with FIG. 5 may delay transmission of the BSR and SR.

In one configuration, the apparatus 500 for wireless communication includes means for obtaining control information that includes a UL SPS configuration and a C-DRX configuration for the scheduled entity, means for obtaining control information that includes a QoS for the UL traffic, means for obtaining a permission to delay transmission of UL traffic, means for determining to delay transmission of UL traffic based on at least a priority level of the UL traffic, a type of the UL traffic, a power saving mode of the scheduled entity, or a result of a cost function, means for determining to delay the transmission of UL traffic based on at least the permission, a priority level of the UL traffic and at least one channel condition measurement, means for delaying the transmission of the UL traffic by skipping one or more of a plurality of UL transmission opportunities, means for delaying transmission of a BSR and an SR based on one or more QoS parameters, means for transmitting the UL traffic during a UL transmission opportunity that is subsequent to the skipped one or more UL transmission opportunities, means for determining at least one threshold corresponding to the at least one channel condition measurement, and/or means for determining a delay threshold for the UL traffic. In one aspect, the aforementioned means may be the processor 504 shown in FIG. 5 configured to perform the functions recited by the aforementioned means. In another aspect, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1 and/or 2, and utilizing, for example, the processes and/or algorithms described herein in relation to FIGS. 6, 9 and/or 10.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, and 5 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for dynamic prioritization of uplink traffic in a wireless communication network, comprising:
   determining, at a scheduled entity operating in a connected mode discontinuous reception (C-DRX) mode, to delay a transmission of uplink (UL) traffic based on at least one of a priority level of the UL traffic, a type of the UL traffic, or a result of a cost function, wherein the determining to delay comprises identifying at least one next available UL transmission opportunity of a plurality of UL transmission opportunities scheduled for UL transmissions whose duration at least partially overlaps in time with an OFF duration of a C-DRX cycle in the C-DRX mode;
   delaying the transmission of the UL traffic by skipping the at least one next available UL transmission opportunity of the plurality of UL transmission opportunities; and
   transmitting the UL traffic during a subsequent UL transmission opportunity of the plurality of UL transmission opportunities that is subsequent to the at least one skipped next available UL transmission opportunity.

2. The method of claim 1, further comprising:
   obtaining control information comprising an UL semi-persistent scheduling (SPS) configuration and a C-DRX configuration for the scheduled entity, wherein the UL SPS configuration indicates the plurality of UL transmission opportunities, wherein the C-DRX configuration indicates the C-DRX cycle comprising an ON duration and the OFF duration, each of the UL transmission opportunities at least partially overlapping in time with the ON duration or the OFF duration.

3. The method of claim 2, wherein the subsequent UL transmission opportunity at least partially overlaps in time with the OFF duration of the C-DRX cycle when the priority level of the UL traffic meets or exceeds a threshold priority level or when an amount of the UL traffic stored in a transmission buffer exceeds a buffer threshold.

4. The method of claim 2, wherein the subsequent UL transmission opportunity at least partially overlaps in time with the ON duration of the C-DRX cycle when the priority level of the UL traffic is below a threshold priority level or when a power saving mode of the scheduled entity is enabled.

5. The method of claim 2, wherein the plurality of UL transmission opportunities comprise UL SPS transmission grants.

6. The method of claim 1, further comprising:
   obtaining control information comprising a quality of service (QoS) for the UL traffic, the quality of service indicating the priority level of the UL traffic,
   wherein determining to delay the transmission of the UL traffic further comprises determining to delay the transmission of the UL traffic when the priority level of the UL traffic is below a threshold priority level.

7. The method of claim 6, wherein the priority level of the UL traffic is one of a first priority level or a second priority level, and wherein the threshold priority level is a third priority level, the first and second priority levels being lower than the third priority level.

8. The method of claim 6, wherein determining to delay the transmission of the UL traffic further comprises:
   determining to delay the transmission of the UL traffic when the type of the UL traffic is delay tolerant.

9. The method of claim 6, wherein determining to delay the transmission of the UL traffic further comprises:
   determining to delay the transmission of the UL traffic when a power saving mode of the scheduled entity is enabled.

10. The method of claim 6, wherein determining to delay the transmission of the UL traffic further comprises:
    determining to delay the transmission of the UL traffic when the result of the cost function exceeds a cost function threshold.

11. The method of claim 1, wherein a delay resulting from skipping the at least one skipped next available UL transmission opportunity is less than or equal to a maximum delay time associated with the UL traffic.

12. A method for dynamic prioritization of uplink traffic in a wireless communication network, comprising:
    obtaining, at a scheduled entity, a permission to delay a transmission of uplink (UL) traffic;
    determining, at the scheduled entity operating in a connected mode discontinuous reception (C-DRX) mode, to delay the transmission of the UL traffic based on at least the permission, a priority level of the UL traffic and at least one channel condition measurement, wherein the determining to delay comprises identifying at least one next available UL transmission opportunity of a plurality of UL transmission opportunities scheduled for UL transmissions whose duration at least partially overlaps in time with an OFF duration of a C-DRX cycle in the C-DRX mode;
    delaying the transmission of the UL traffic by skipping the at least one next available UL transmission opportunity of the plurality of UL transmission opportunities; and
    transmitting the UL traffic during a subsequent UL transmission opportunity of the plurality of UL transmission opportunities that is subsequent to the at least one skipped next available UL transmission opportunity.

13. The method of claim 12, further comprising:
    determining at least one threshold corresponding to the at least one channel condition measurement.

14. The method of claim 13, wherein determining the at least one threshold corresponding to the at least one channel condition measurement further comprises:
    determining at least one of a first threshold for a reference signal received power (RSRP), a second threshold for a reference signal received quality (RSRQ), a third threshold for a reference signal strength indicator (RSSI), or a fourth threshold for a signal-to-noise ratio (SNR).

15. The method of claim 13, wherein determining to delay the transmission of the UL traffic further comprises:
determining to delay the transmission of the UL traffic when the priority level of the UL traffic is below a threshold priority level and the at least one channel condition measurement is below the at least one threshold corresponding to the at least one channel condition measurement.

16. The method of claim 12, further comprising:
determining a delay threshold for the UL traffic;
wherein the UL traffic is transmitted prior to exceeding the delay threshold.

17. The method of claim 16, wherein the delay threshold comprises a maximum number of subframes or a maximum number of skipped UL transmission opportunities.

18. The method of claim 12, wherein determining to delay the transmission of the UL traffic further comprises:
determining to delay the transmission of the UL traffic when the priority level of the UL traffic is below a threshold priority level and an amount of the UL traffic in a transmission buffer of the scheduled entity is below a buffer threshold.

19. The method of claim 12, further comprising:
delaying transmission of a buffer status report (BSR) and a scheduling request (SR) based on one or more quality of service (QoS) parameters.

20. An apparatus for wireless communication, the apparatus being a scheduled entity and comprising:
a processor;
a transceiver communicatively coupled to the processor; and
a memory communicatively coupled to the processor, wherein the processor is configured to:
determine to delay a transmission of uplink (UL) traffic based on at least one of a priority level of the UL traffic, a type of the UL traffic, or a result of a cost function while operating in a connected mode discontinuous reception (C-DRX) mode, wherein the processor configured to determine to delay is configured to identify at least one next available UL transmission opportunity of a plurality of UL transmission opportunities scheduled for UL transmissions whose duration at least partially overlaps in time with an OFF duration of a C-DRX cycle in the C-DRX mode;
delay the transmission of the UL traffic by skipping the at least one next available UL transmission opportunity of the plurality of UL transmission opportunities; and
transmit the UL traffic during a subsequent UL transmission opportunity that is subsequent to the at least one skipped next available UL transmission opportunity.

21. The apparatus of claim 20, wherein the processor is further configured to:
obtain control information comprising an UL semi-persistent scheduling (SPS) configuration and a C-DRX configuration for the apparatus, wherein the UL SPS configuration indicates the plurality of UL transmission opportunities, wherein the C-DRX configuration indicates the C-DRX cycle comprising an ON duration and the OFF duration, each of the UL transmission opportunities at least partially overlapping in time with the ON duration or the OFF duration.

22. The apparatus of claim 21, wherein the subsequent UL transmission opportunity at least partially overlaps in time with the OFF duration of the C-DRX cycle when the priority level of the UL traffic meets or exceeds a threshold priority level or when an amount of the UL traffic stored in a transmission buffer exceeds a buffer threshold.

23. The apparatus of claim 21, wherein the subsequent UL transmission opportunity at least partially overlaps in time with the ON duration of the C-DRX cycle when the priority level of the UL traffic is below a threshold priority level or when a power saving mode of the scheduled entity is enabled.

24. The apparatus of claim 20, wherein the processor is further configured to:
obtain control information comprising a quality of service (QoS) for the UL traffic, the quality of service indicating the priority level of the UL traffic; and
determine to delay the transmission of the uplink (UL) traffic when the priority level of the UL traffic is below a threshold priority level.

25. The apparatus of claim 24, wherein the processor is further configured to:
determine to delay the transmission of the UL traffic when the type of the UL traffic is delay tolerant, a power saving mode of the scheduled entity is enabled, or the result of the cost function exceeds a cost function threshold.

26. An apparatus for wireless communication, the apparatus being a scheduled entity and comprising:
a processor;
a transceiver communicatively coupled to the processor; and
a memory communicatively coupled to the processor, wherein the processor is configured to:
obtain a permission to delay a transmission of uplink (UL) traffic;
determine to delay the transmission of the UL traffic based on at least a priority level of the UL traffic and at least one channel condition measurement while operating in a connected mode discontinuous reception (C-DRX) mode, wherein the processor configured to determine to delay is configured to identify at least one next available UL transmission opportunity of a plurality of UL transmission opportunities scheduled for UL transmissions whose duration at least partially overlaps in time with an OFF duration of a C-DRX cycle in the C-DRX mode;
delay the transmission of the UL traffic by skipping the at least one next available UL transmission opportunity of the plurality of UL transmission opportunities; and
transmit the UL traffic during a subsequent UL transmission opportunity of the plurality of UL transmission opportunities that is subsequent to the at least one skipped next available UL transmission opportunity.

27. The apparatus of claim 26, wherein the processor is further configured to:
determine at least one threshold corresponding to the at least one channel condition measurement; and
determine to delay the transmission of the UL traffic when the priority level of the UL traffic is below a threshold priority level and the at least one channel condition measurement is below the at least one threshold corresponding to the at least one channel condition measurement.

28. The apparatus of claim 26, wherein the processor is further configured to:
determine a delay threshold for the UL traffic;
wherein the UL traffic is transmitted prior to exceeding the delay threshold.

29. The apparatus of claim 28, wherein the delay threshold comprises a maximum number of subframes or a maximum number of skipped UL transmission opportunities.

30. The apparatus of claim 26, wherein the processor is further configured to:
  determine to delay the transmission of the UL traffic when the priority level of the UL traffic is below a threshold priority level and an amount of the UL traffic in a transmission buffer of the scheduled entity is below a buffer threshold.

* * * * *